United States Patent
Kim et al.

(10) Patent No.: US 12,523,569 B2
(45) Date of Patent: Jan. 13, 2026

(54) MULTI-CHANNEL POWER PROFILE ESTIMATION

(71) Applicant: 1FINITY Inc., Kawasaki (JP)

(72) Inventors: Inwoong Kim, Allen, TX (US); Olga I. Vassilieva, Plano, TX (US); Ryu Shinzaki, Kawasaki (JP); Motohiko Eto, Kawasaki (JP); Shoichiro Oda, Tokyo (JP); Paparao Palacharla, Richardson, TX (US)

(73) Assignee: 1FINITY Inc., Kawasaki (JP)

( * ) Notice: Subject to any disclaimer, the term of this patent is extended or adjusted under 35 U.S.C. 154(b) by 33 days.

(21) Appl. No.: 18/402,628

(22) Filed: Jan. 2, 2024

(65) Prior Publication Data

US 2024/0369447 A1    Nov. 7, 2024

Related U.S. Application Data

(60) Provisional application No. 63/499,995, filed on May 4, 2023.

(51) Int. Cl.
*G01M 11/00* (2006.01)
*H04B 10/564* (2013.01)

(52) U.S. Cl.
CPC ......... *G01M 11/335* (2013.01); *H04B 10/564* (2013.01)

(58) Field of Classification Search
CPC . G01M 11/335; H04B 10/564; H04B 10/0795
See application file for complete search history.

(56) References Cited

U.S. PATENT DOCUMENTS

| 5,696,857 A * | 12/1997 | Frederick | G01D 5/35383 385/12 |
| 10,211,920 B1 * | 2/2019 | Khaleghi | H04Q 11/0066 |

(Continued)

OTHER PUBLICATIONS

I, Kim, "Robust Longitudinal Power Profile Estimate in Optical Networks using MMSE with Complex Scaling Factor", OFC Mar. 5, 2023.

(Continued)

*Primary Examiner* — Tarifur R Chowdhury
*Assistant Examiner* — Kemaya Nguyen
(74) *Attorney, Agent, or Firm* — Maschoff Brennan

(57) ABSTRACT

A method may include obtaining a first waveform corresponding to a first optical signal received at a first optical receiver via an optical link, and a second waveform profile corresponding to a second optical signal received a second optical receiver. The first waveform profile and the second waveform profile may be combined to form a combined waveform profile. A first reconstructed waveform profile that is an estimate of the first waveform profile and a second reconstructed waveform profile that is an estimate of the second waveform profile may be obtained. The first reconstructed waveform profile and the second reconstructed waveform profile may be combined to form a combined reconstructed waveform profile which may be emulated to obtain an emulated reconstructed waveform profile. A power profile estimation corresponding to the optical ink may be determined based on a comparison between the combined waveform profile and the emulated reconstructed waveform profile.

20 Claims, 8 Drawing Sheets

(56) References Cited

U.S. PATENT DOCUMENTS

| 2006/0216029 A1* | 9/2006 | Vassilieva | H04J 14/0204 |
| | | | 398/83 |
| 2013/0198704 A1* | 8/2013 | Hogan | G06F 30/33 |
| | | | 716/109 |
| 2017/0126353 A1* | 5/2017 | Croussore | H04B 10/2543 |

OTHER PUBLICATIONS

T. Tanimura, "Experimental Demonstration of a Coherent Receiver that Visualizes Longitudinal Signal Power Profile over Multiple Spans out of Incoming Signal", ECOC Sep. 22, 2019.

T, Sasai, "Simultaneous Detection of Anomaly Points and Fiber types in Multi-span Transmission Links Only by Receiver-side Digital Signal Processing", OFC Mar. 8, 2020.

S. Gleb, "Fiber Link Anomaly Detection and Estimation Based on Signal Nonlinearity", ECOC Sep. 13, 2021.

T. Sasai, "Proposal of Linear Least Squares for Fiber-Nonlinearity-Based Longitudinal Power Monitoring in Multi-Span Link", OECC Jul. 3, 2022.

* cited by examiner

MULTI-CHANNEL POWER PROFILE ESTIMATION

CROSS-REFERENCE TO RELATED APPLICATION

This patent application claims the benefit of and priority to U.S. Provisional App. No. 63/499,995 filed on May 4, 2023, which is incorporated in the present disclosure by reference in its entirety.

FIELD

The present disclosure generally relates to multi-channel power profile estimation.

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network.

In some instances, the power of optical signals can vary along the length of communication links (e.g., along the length of optical fibers) due to various factors such as attenuation, dispersion, and nonlinear effects. Estimating a power profile corresponding to such links may be helpful for system design, optimization, and performance evaluation.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a first waveform corresponding to a first optical signal received at a first optical receiver via an optical link, and a second waveform profile corresponding to a second optical signal received a second optical receiver via the optical link. The first waveform profile and the second waveform profile may be combined to form a combined waveform profile. The method may also include obtaining a first reconstructed waveform profile that is an estimate of the first waveform profile and a second reconstructed waveform profile that is an estimate of the second waveform profile. The first reconstructed waveform profile and the second reconstructed waveform profile may be combined to form a combined reconstructed waveform profile. The combined reconstructed waveform profile may be emulated over the optical link to obtain an emulated reconstructed waveform profile. In addition, the method may include determining a power profile estimation corresponding to the optical ink based on a comparison between the combined waveform profile and the emulated reconstructed waveform profile.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1A:
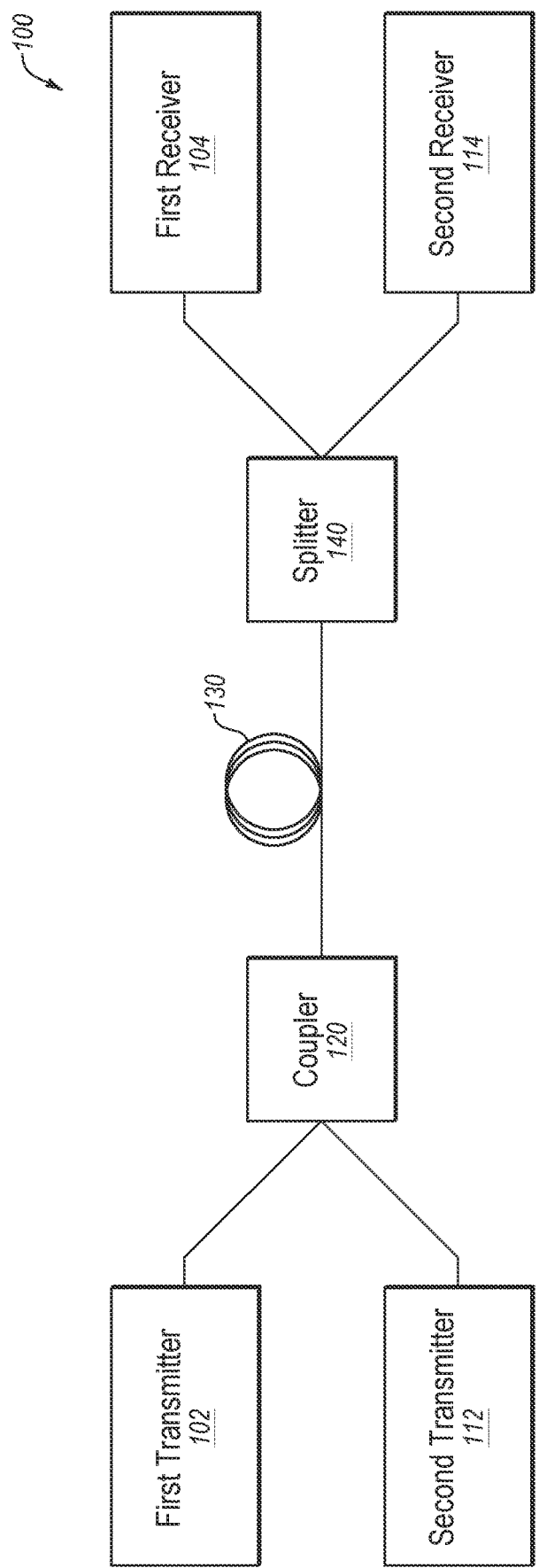
FIG. 1A illustrates an example system configured to implement multi-channel power profile estimation, in accordance with one or more embodiments of the present disclosure.

Optical systems may include nodes that may be configured to communicate information to each other via optical signals that are propagated along optical links, which may include optical fibers. The power distribution of optical signals as the optical signals propagate in an optical fiber may be influenced by several factors, including attenuation, dispersion, nonlinearities, and other impairments. Power profile estimation (PPE), such as longitudinal power profile estimation, may be used to determine an estimate of the power levels of optical signals at different positions along the optical fiber. In some embodiments, PPE may be used to analyze the signal degradation and improve system performance.

Some techniques of determining PPE may include comparing a received waveform profile of an optical signal received at an optical receiver with an emulated waveform profile for the optical signal. Generating or determining emulated waveform profiles may include simulating the behavior of optical signals as the optical signals propagate through the fiber, while accounting for the physical characteristics of the optical fiber and the properties of the signals themselves. In some instances, accuracy of such PPE generated by comparing the received waveform profile and the emulated waveform profile may be reduced in portions of the optical fiber where optical power is smaller. For instance, the accuracy may drop where nonlinear interference (NLI) noise is small due to fiber attenuation.

To increase the accuracy of the PPE, for example, for such portions or regions of the optical fiber, the NLI noise of the optical signals may be increased by increasing optical signal power. The increased optical signal power may increase the NLI noise, which may provide increased amount of optical power and/or a corresponding waveform profile to determine a more accurate PPE of the fiber. Thus, increasing the optical signal power and/or the NLI noise may allow the PPE to be more accurate. However, such an increase may not be preferable in live optical fibers as the increased NLI noise may cause issues such as signal distortion. For instance, increasing the optical signal power and associated noise may cause the optical signals to be distorted due to the increased noise. Additionally or alternatively, step size of the PPE may be adjusted to increase accumulation of the NLI noise in the regions where the optical signal power may be low, which may provide more accurate PPE. For instance, the granularity or resolution at which the optical signal power is provided may be measured. The step size may be adjusted by adjusting the distance between consecutive measurement points on the PPE. However, adjusting the step size to increase accumulation of the NLI noise may reduce spatial resolution in the regions where the optical signal power is low.

In some instances, multiple optical signals may be used to help to increase accuracy of the PPE. For instance, multiple individual optical signals may be propagated across one or more optical fibers, and individual PPEs corresponding to the multiple individual optical signals may be determined. An average of the individual PPEs may be determined to represent the PPE of the fiber. However, such an approach may increase noise present in the PPE in the regions with low optical signal power as the individual PPES are determined without compensating for and/or considering the low optical signal power in certain regions.

The present disclosure may relate to, among others, a system and a method related to improving accuracy of the PPE by co-propagating multiple optical signals along an optical fiber. In some embodiments, rather than finding individual PPEs corresponding to the multiple optical signals and calculating an average of the PPEs, waveform profiles generated by the co-propagating multiple optical signals may be combined prior to determining the PPE for the optical fiber. For example, a reference waveform profile at the receiver side and a reconstructed waveform profile at the transmitter side may be determined for each optical signal. The reference waveform profiles may be combined to generate a combined reference waveform profile. Additionally, the reconstructed waveform profiles may be combined to generate a combined reconstructed waveform profile. In some instances, the combined reconstructed waveform profile may be emulated over the optical fiber to generate an emulated reconstructed waveform profile. The emulated reconstructed waveform profile may be compared against the combined reference waveform profile to determine the PPE of the optical fiber. Determining the PPE associated with the optical fiber using the combined reconstructed waveform profile and the combined reference waveform profile may improve the accuracy of the PPE. In particular, using the combined reconstructed waveform profile and the combined reference waveform profile may improve the accuracy for regions of the optical fiber with optical signals with low power.

Embodiments of the present disclosure are explained with reference to the accompanying figures.

FIG. 1A illustrates an example system 100 configured to implement multi-channel power profile estimation, in accordance with one or more embodiments of the present disclosure. In some embodiments, the system 100 may include a first transmitter 102, a second transmitter 112, a coupler 120, an optical span 130, a splitter 140, a first receiver 104, and a second receiver 114. In general, the system 100 may be configured to determine a power profile estimation (PPE) of the optical span 130. The optical span 130 may include optical fibers, amplifiers, among other optical components.

In some embodiments, the first transmitter 102 and the second transmitter 112 may be configured to provide a first optical signal and a second optical signal to the optical span 130, respectively. In some embodiments, the first optical signal may be transmitted at a first range of wavelengths, and the second optical signal may be transmitted at a second range of wavelengths. In some embodiments, the first range of wavelengths and the second range of wavelengths may be different. For instance, the first range of wavelengths and the second range of wavelengths may operate in separate channels within the optical span 130. In these and other embodiments, the channels may be adjacent or directly adjacent channels. As such, the first range of wavelengths and the second range of wavelength may be directly adjacent. For example, a wavelength of the first range of wavelengths may be directly adjacent to a wavelength of the second range of wavelengths.

In some embodiments, the optical signals may have corresponding waveform profiles. For instance, a first waveform profile may correspond to the first optical signal, and a second waveform profile may correspond to the second optical signal. In these instances, the waveform profiles may refer to shapes and characteristics of the optical signals. The waveform profiles may vary over time and may provide information on behavior of the optical signals. For example, the waveform profiles may indicate one or more of amplitude, modulation, bit rate, pulse shape, or dispersion.

In some embodiments, the first optical signal and the second optical signal may be provided to the coupler 120. In these and other embodiments, the coupler 120 may be optically coupled between the first transmitter 102 and the optical span 130; and between the second transmitter 112 and the optical span 130. The coupler 120 may be configured to obtain and to multiplex optical signals onto the optical span 130. For example, the coupler 120 may obtain the first optical signal and the second optical signal from the first transmitter 102 and the second transmitter 112, respectively, and to multiplex and/or combine the first optical signal and the second optical signal onto the optical span 130. In some embodiments, the coupler 120 may include any coupler suitable to multiplex multiple optical signals. For example, the coupler 120 may include a wavelength division multiplexer (WDM). Additionally or alternatively, the coupler 120 may include one or more optical components, fused optical fibers, or waveguides configured to multiplex the first optical signal and the second optical signal.

In some embodiments, the coupler 120 may obtain the first optical signal and the second optical signal via separate optical paths. For instance, the first transmitter 102 may be optically coupled to the coupler 120 via a first optical path, and the second transmitter 112 may be optically coupled to the coupler 120 via a second optical path. In some embodiments, the separate optical paths may cause different evolution of state of polarization (SOP) for the first optical signal and the second optical signal. The SOP of an optical signal may represent polarization characteristics of electromagnetic waves that make up the optical signal. For instance, the SOP may describe orientations of electric field vectors as the optical signal propagates through space. In some instances, the SOP of an optical signal may be one of linear polarization (e.g., electric filed oscillates in a straight line), circular polarization (e.g., electric field vector traces a circular path), or elliptical polarization (e.g., combination of the linear polarization and the circular polarization). The SOP may be modified and/or changed as the optical signal travels through different optical components, materials, and/or environments such as an optical fiber. In such instances, the SOP of the optical signals may change due to different factors such as birefringence in the optical fiber, stress, and/or other environmental factors. In dual polarization optical signal, the horizontal polarization component of the first optical signal may not be aligned with the horizontal polarization component of the second optical signal at the coupler 120. And the relative SOP differences may not be known due to random nature of birefringence in the optical fiber between transmitters (e.g., the first transmitter 102 and/or the second transmitter 112) and the coupler 120.

In some embodiments, the first receiver 104 may be configured to receive and/or obtain the first optical signal generated and/or transmitted by the first transmitter 102, and the second receiver 114 may be configured to receive and/or obtain the second optical signal generated and/or transmitted by the second transmitter 112. For instance, the first optical signal and the second optical signal coupled by the coupler 120 and propagated through the optical span 130 may be decoupled and/or split back to separate signals (e.g., the first optical signal and the second optical signal). For instance, the splitter 140 may be configured to decouple and/or demultiplex the first optical signal and the second optical signal.

In some embodiments, the splitter may include component suitable to decouple a set of optical signals coupled by the coupler 120. For example, the splitter 140 may include an arrayed waveguide grating (AWG) demux, passive optical demux, prism based WDM demux, tunable WDM demux, among others.

In some embodiments, the first receiver 104 may obtain the first optical signal, and the second receiver 114 may obtain the second optical signal. In some embodiments, the first waveform profile and the second waveform profile may be collected from the first optical signal and the second optical signal, respectively, as received by the first receiver 104 and the second receiver 114. In some embodiments, the first receiver 104 and the second receiver 114 may be optically coupled to the splitter 140 via separate optical paths. For instance, the first receiver 102 may be coupled to the splitter 140 via a third optical path, and the second receiver 114 may be coupled to the splitter 140 via a fourth optical path. In these and other embodiments, the separate optical paths may cause the first receiver 104 and the second receiver 114 to obtain the first optical signal and the second optical signal, respectively, at different times. In some embodiments, the separate paths may cause a relative delay between optical signals traversing the third optical path and the fourth optical path.

In some embodiments, the first waveform profile and the second waveform profile received by the first receiver 104 and the second receiver 114, respectively, may be combined. For instance, the first waveform profile and the second waveform profile may be combined to form a combined waveform profile indicative of the first optical signal and the second optical signal generated and/or transmitted by the first transmitter 102 and the second transmitter 112. In some embodiments, the combined waveform profile may be used to determine a power profile estimation of the optical span 130 as illustrated with more detail in FIG. 1B of the present disclosure.

Modifications, additions, or omissions may be made to the system 100 without departing from the scope of the present disclosure. For example, in some embodiments, the system 100 may include any number of other components that may not be explicitly illustrated or described.

Figure 1B:
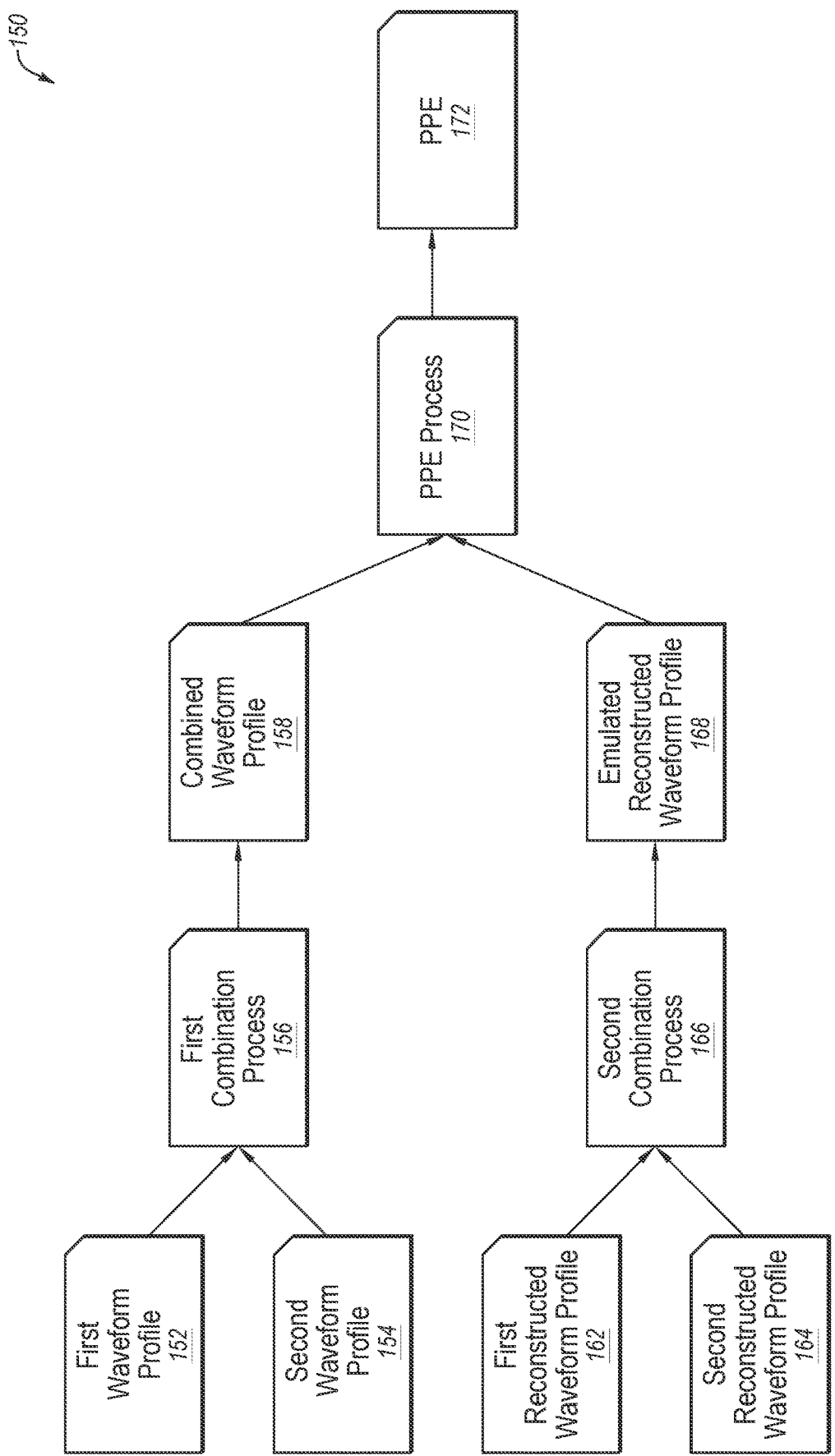
FIG. 1B illustrates an example process for multi-channel power profile estimation, in accordance with one or more embodiments of the present disclosure.

FIG. 1B illustrates an example process 150 of multi-channel power profile estimation, in accordance with one or more embodiments of the present disclosure. For instance, the process 150 may be configured to determine a power profile estimation (PPE) of optical fiber such as optical fiber in the optical span 130 of FIG. 1A. In these and other embodiments, the process 150 may determine the PPE using waveform profiles of optical signals received at receivers such as the first receiver 104 and the second receiver 114. In some embodiments, the process 150 may include one or more processes configured to perform different operations to determine the PPE. For example, in some embodiments, the process 150 may include a first combination process 156, a second combination process 166, and a PPE process 170. In the present disclosure, a process may include and/or represent a set of operations that may be implemented to perform a specific task and/or to solve a particular problem. The process may include a manipulation of data that may be performed by a software application using one or more systems that include processors and memory.

In some embodiments, the first combination process 156 may be configured to obtain a first waveform profile 152 and a second waveform profile 154 to form a combined waveform profile 158. In some embodiments, the first waveform profile 152 and the second waveform profile 154 may correspond to a first optical signal and a second optical signal, respectively, that propagated through an optical span and are received at a first receiver (e.g., such as the first receiver 104 of FIG. 1A) and a second receiver, respectively (e.g., such as the second receiver 114 of FIG. 1A). In these and other embodiments, the first waveform profile 152 and the second waveform profile 154 may correspond to the first optical signal and the second optical signal, respectively, generated by different transmitters such as the first transmitter 102 of FIG. 1A and the second transmitter 112 of FIG. 1A, respectively.

In these and other embodiments, the first waveform profile 152 may represent an optical waveform of the first optical signal as received at the first receiver. For example, the first waveform profile 152 may provide information regarding characteristics of the first optical signal. The second waveform profile 154 may represent an optical waveform of the second optical signal as received at the second receiver. For example, the second waveform profile 154 may provide information regarding characteristics of the second optical signal.

In some embodiments, the first waveform profile 152 and the second waveform profile 154 may be obtained and/or determined by performing one or more operations with respect to the first optical signal and the second optical signal, respectively.

For example, the first optical receiver may receive and analyze the first optical signal to determine the first waveform profile 152. For instance, samples of the data stream generated by the first optical receiver that represent the first optical signal may be obtained. The samples may be used to generate the first waveform profile 152. In these and other embodiments, the samples may be obtained before de-mapping of symbols from the first optical signal. In some embodiments, one or more operations may be applied to the data stream before the data stream is sampled to generate the first waveform profile 152.

In some embodiments, the one or more operations may include chromatic dispersion compensation. Chromatic dispersion may refer to a phenomenon in optical communication where different wavelengths of light travel at different speeds through an optical span or an optical fiber. In some instances, compensation for chromatic dispersion of the first optical signal may be performed using one or more compensation methods. For example, a compensation method may include phase modulation (e.g., phase of the first optical signal may be modulated), optical equalization (e.g., optical filters such as optical equalizers that modify spectral characteristics of optical signals may be applied to the first optical signal). In these and other embodiments, any other suitable compensation methods may be used.

In some embodiments, in response to the chromatic dispersion being compensated, an adaptive equalizer may be implemented in the system 100. The adaptive equalizer may undo random polarization rotation and/or compensate for polarization mode dispersion (PMD). In some instances, following the adaptive equalizer, the chromatic dispersion from transmission through optical fiber may be added back into the optical signal. In such instances, the combined waveform profile 158 may include an impact of fiber dispersion and fiber nonlinearity without other impairments such as carrier phase noise, PMD, among others.

In some embodiments, the one or more operations may include the data stream being processed by an adaptive equalizer. The adaptive equalizer may include a process and/or a device configured to mitigate effects of channel distortion, interference, and signal degradation. Additionally or alternatively, the first optical signal may be processed by a frequency offset compensator (FOC). The FOC may include an algorithm, or a processing component configured to mitigate frequency offsets that may occur while the first optical signal is traveling through the optical span.

Additionally or alternatively, the one or more operations may include performing carrier phase recovery (CPR) on the data stream. The CPR may include a process that may correct the phase of the first optical signal which may restore and/or retain accurate demodulation of the first optical signal. In some embodiments, Nyquist pulse shaping may be used. For instance, the Nyquist pulse shaping may be configured to design and/or modify the samples.

In these and other embodiments, the second waveform profile 154 may be generated in a similar manner to the first waveform profile 152. For instance, the one or more operations applied to the first optical signal to determine the first waveform profile 152 may be applied to the second optical signal to determine the second waveform profile 154.

In some embodiments, the first combination process 156 may include one or more operations that may be performed to combine the first waveform profile 152 and the second waveform profile 154 to form the combined waveform profile 158. For instance, the first combination process may include one or more operations such as up-sampling, frequency shifting, or summing of the first waveform profile 152 and the second waveform profile 154. The waveform profiles may be up-sampled such that the optical signals may be better represented by the waveform profiles. For instance, up-sampling a waveform profile may include increasing a sample rate used to generate the waveform profile or a number of data points in the waveform profile. For example, up-sampling may be performed where the first waveform profile 152 or the second waveform profile 154 are generated using less than a threshold number of samples. The up-sampling may be performed using any suitable technique. For example, in some embodiments, the up-sampling may be performed using pulse shaping and/or zero padding.

In these and other embodiments, frequency shifting may include translating and/or moving a center frequency of the waveform profile. In some embodiment, the shifting may be performed to shift a center frequency of one or both of the first waveform profile 152 and the second waveform profile 154 such that the center frequency of the first waveform profile 152 and the center frequency of the second waveform profile 154 are separated by channel spacing. The bandwidth of the up-sampled waveform may be at least the sum of the signal bandwidth and the channel spacing.

In some embodiments, the up-sampled and/or shifted first waveform profile 152 and the second waveform profile may be summed to form the combined waveform profile 158. In these and other embodiments, the first waveform profile 152 and the second waveform profile 154 may be summed after the center frequencies of the first waveform profile 152 and/or the second waveform profile 154 have been shifted. In some embodiments, the summing of the first waveform profile 152 and the second waveform profile 154 may be performed with respect to the frequency domain. For example, complex amplitudes or phases of the first waveform profile 152 and the second waveform profile 154 may be summed.

In some embodiments, the second combination process 166 may include one or more operations similar to the operations of the first combination process 156. For instance, the second combination process 166 may be configured to combine a first reconstructed waveform profile 162 and a second reconstructed waveform profile 164. In some embodiments, the first reconstructed waveform profile 162 may include a synthetic and/or modeled representation of the first waveform profile 152. For instance, the first reconstructed waveform profile 162 and the second waveform profile 164 may be reconstructed based on the data and/or symbols obtained by the receivers such as the first receiver 104 and the second receiver 114 of FIG. 1A.

In some embodiments, the first reconstructed waveform profile 162 and the second reconstructed waveform profile 164 may be waveforms that are generated based on the first optical signal and the second optical signal, respectively. For example, based on data and/or symbols included in the first optical signal and the second optical signal received at the first receiver 104 and the second receiver 114, a digital signal processing (DSP) process may be configured to perform a reconstruction of the first optical signal and the second optical signal as transmitted by a first transmitter and a second transmitter, respectively, using any suitable technique. For instance, the transmitted waveforms at the transmitter may be reconstructed based on known characteristics of the optical transmitter. For instance, the DSP process may apply one or more algorithms to apply the known characteristics of the transmitters in reconstructing the waveforms. For example, the one or more algorithms may include one or more of forward error correction (FEC) encoder, bit-mapper, symbol-mapper, constellation shaping, or pulse shaping.

The second combination process 166 may include one or more operations (e.g., up-sampling, frequency shifting, and summing) similar to the first combination process 156 to combine the first reconstructed waveform profile 162 and the second reconstructed waveform profile 164 to form a combined reconstructed waveform profile. In these and other embodiments, an emulated reconstructed waveform profile 168 may be determined based on the combined reconstructed waveform profile. For instance, the emulated reconstructed waveform profile 168 may be determined by transmission emulation of the combined reconstructed waveform profile.

In some embodiments, the first waveform profile 152 and the second waveform profile 154 may include the bandwidths of the channels. In some instances, the combined waveform profile 158 generated by combining the first waveform profile 152 and the second waveform profile 158 may not include frequency component of nonlinear interference outside of the channel bandwidths. Contrastingly, the emulated reconstructed waveform profile 168 may include the nonlinear interference components outside of the channel bandwidths. In such instances, although the nonlinear interference components may include relatively small power, the nonlinear interference components may cause errors in the PPE. In these and other embodiments, multi-bandpass filter may be applied to nonlinear transmission emulation of the combined reconstructed waveform profile to filter the nonlinear interference noise between channels. For instance, the combined waveform profile 158 and the emulated reconstructed waveform profile 168 may be more aligned without nonlinear interference noise between channels.

In some embodiments, the PPE process 170 may be implemented using the combined waveform profile 158 and the emulated reconstructed waveform profile 168 to determine a PPE 172. For instance, the PPE process 170 may compare the combined waveform profile 158 and the emulated reconstructed waveform profile 168 to determine the PPE 172.

For example, the PPE process 170 may analyze power characteristics of the combined waveform profile 158 and the emulated reconstructed waveform profile 168 to make a comparison of the combined waveform profile 158 and the emulated reconstructed profile 168 to determine the PPE 172. In these instances, the comparison of the combined waveform profile 158 and the emulated reconstructed waveform profile 168 may provide assessment of a quality of nonlinear transmission emulation of the combined reconstructed waveform profile 168. For instance, deviations of the combined waveform profile 158 from the emulated reconstructed waveform profile 168 may indicate that certain parameters of the transmission emulation may be inaccurate, especially the estimated power profile along the transmission link in PPE. In some embodiments correct estimated power profile for emulation may be determined by maximizing correlations between the combined waveform profile 158 and the emulated reconstructed waveform profile 168.

In some embodiments, a power estimation technique may be used to calculate the PPE 172 based on the combined waveform profile 158 and the reconstructed estimated waveform profile 168. In these and other embodiments, any suitable power estimation technique may be used. For example, the power estimation technique may include root mean square (RMS) power, average power, power spectral density (PSD), instantaneous power, energy spectral density (ESD), power vs. time (PvT) analysis, and any other suitable methods.

In some embodiments, the power estimation technique may include a Minimum Mean Square Error (MMSE). The MMSE technique may estimate the power profile by minimizing a mean square error (MSE) corresponding to a comparison between the combined waveform profile 158 and the emulated reconstructed waveform profile 168. In these and other embodiments, an optical fiber may include one or more segments. The one or more segments may be associated with corresponding one or more parameters describing nonlinear noise in the one or more segments. As the MSE is reduced, the one or more parameters may be proportional to optical signal power. A proportional factor between the optical signal power and the one or more parameters may be determined based on fiber characteristics (e.g., nonlinear coefficient, length of a segment, etc.), which may be plotted to determine the PPE 172.

In some embodiments, the nonlinear parameters in segments of optical fibers for transmission emulation may be adjusted to minimize the MSE. For example, the nonlinear parameters of the segments in transmission emulation of the combined reconstructed waveform profile may be adjusted using gradient descent algorithm to reduce the MSE such that the deviations or differences between the combined waveform profile 158 and the emulated reconstructed waveform profile 168 may be reduced. Additionally or alternatively, the optimal parameters may be determined using the least square method.

For instance, a squared difference between the corresponding parts (e.g., segments or frequency bins) of the combined waveform profile 158 and the emulated reconstructed waveform profile 168 may be determined. An average of squared differences of different parts may be calculated to determine the MSE.

In these and other embodiments, the first optical signal and the second optical signal may be adjusted based on the MSE. In some instances, the adjustment may improve the accuracy of the PPE by reducing potential errors in combining the waveform profiles that may be caused by unknown random factors before and/or after couplers (e.g., the coupler 120 and the splitter 140 of FIG. 1A). For instance, different parameters and/or characteristics of the first optical signal and the second optical signal may be adjusted to minimize the MSE such that the deviations or differences between the combined waveform profile 158 and the emulated reconstructed waveform profile 168 may be minimized and/or optimized. A process of adjusting different parameter and/or the characteristics of the optical signals may be discussed in further detail with respect to FIG. 3 of the present disclosure.

Figure 2A:
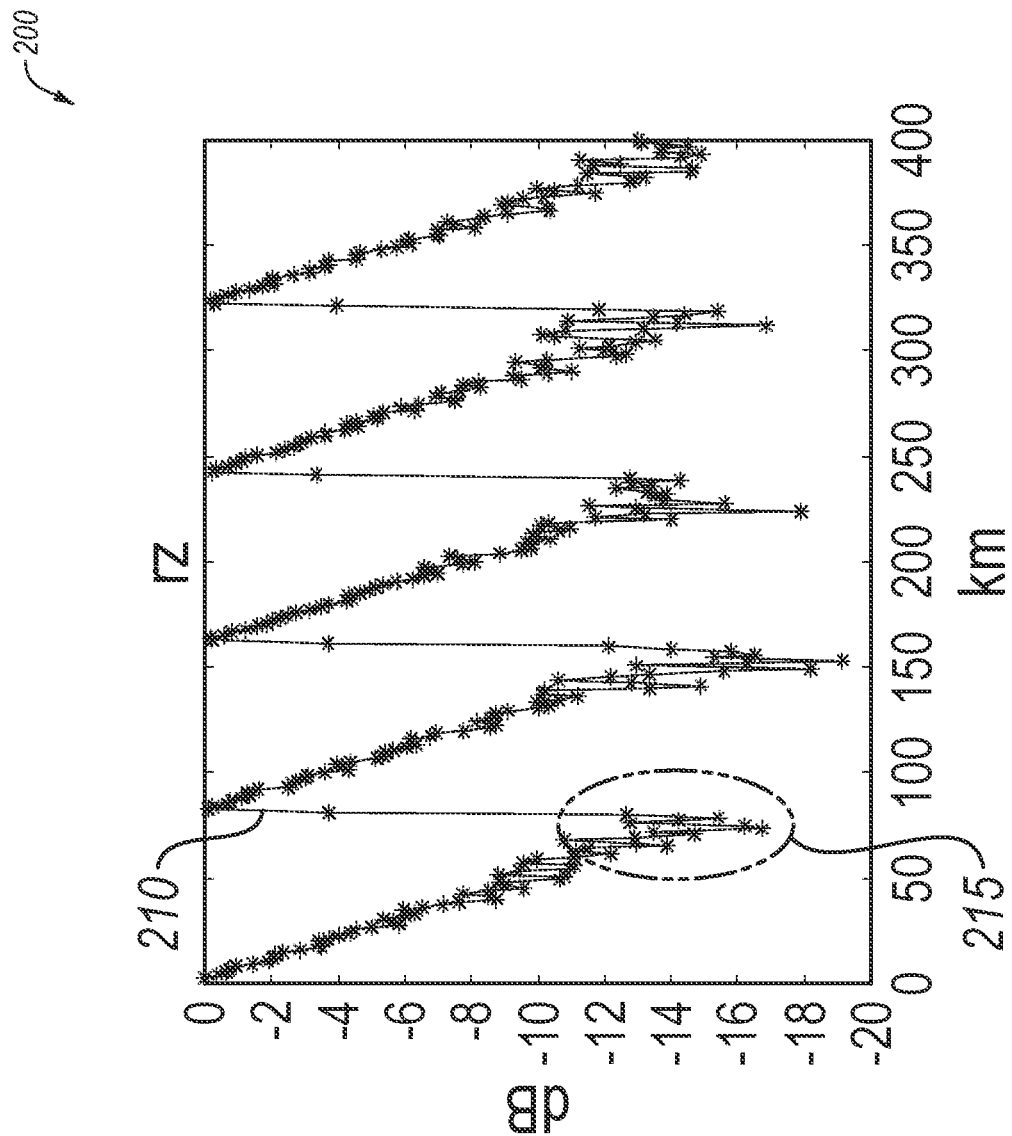
FIG. 2A-2C illustrate example graphs representing power profile estimation determined based on different methods.

In some embodiments, determining the PPE 172 based on the combined waveform profile 158 and the emulated reconstructed waveform profile 168 may increase an accuracy of the PPE 172 compared to another PPE determined using a single waveform profile and a single estimated profile. For example, FIG. 2A illustrates a graph 200 representing a power profile estimation 210. In some instances, the power profile estimation 210 may represent a power profile of an optical fiber calculated based on a single waveform profile. For instance, the power profile estimation 210 may illustrate estimated power loss based on the distance traveled by the optical signal associated with the power profile estimation 210. For example, the power profile estimation 210 may be illustrated as a relationship between power loss (e.g., decibels (dB)) and distance (e.g., kilometer (km)). For instance, the graph 200 may include an x-axis representing distance and a y-axis representing loss in optical power.

In some instances, the power profile estimation 210 may follow a certain pattern. For instance, the power profile estimation 210 may illustrate a certain power profile estimation that gradually reaches around −16 dB every 75 km. However, measuring such a pattern and/or the specific power loss at different distances may be difficult due to the noise in the power profile estimation. For example, at a certain distance, the power profile estimation may be illustrated as a range rather than a point due to the noise (e.g., indicated by a pair of *'s and a line between the *'s illustrating a range). In some instances, the power profile estimation 210 may include more noise in regions or portions corresponding to portions of the optical signal where optical power is low. For instance, a region 215 points to an example portion of the power profile estimation 210 where the noise is increasing as the optical power decreases. As an example, at distance 75 km, the optical power may be measured as having a loss between around −13 dB to −17 dB instead. Additionally the power profile estimation 210 may illustrate uneven power loss at different distances. For instance, at distance 150 km, the lowest power profile may be around −20 dB compared to around −17 dB at 75 km.

Such increased noise may be caused by power attenuation of the optical signal as the optical signal travels along an optical span. For instance, nonlinear interference (NLI) noise may decrease due to the power attenuation. While the NLI noise may cause undesired distortion to the optical signal, the NLI noise may help measure the power profile estimation 210. In the portions where the NLI noise is low due to the power attenuation, the power profile estimation 210 may not be measured as accurately.

Figure 2B:
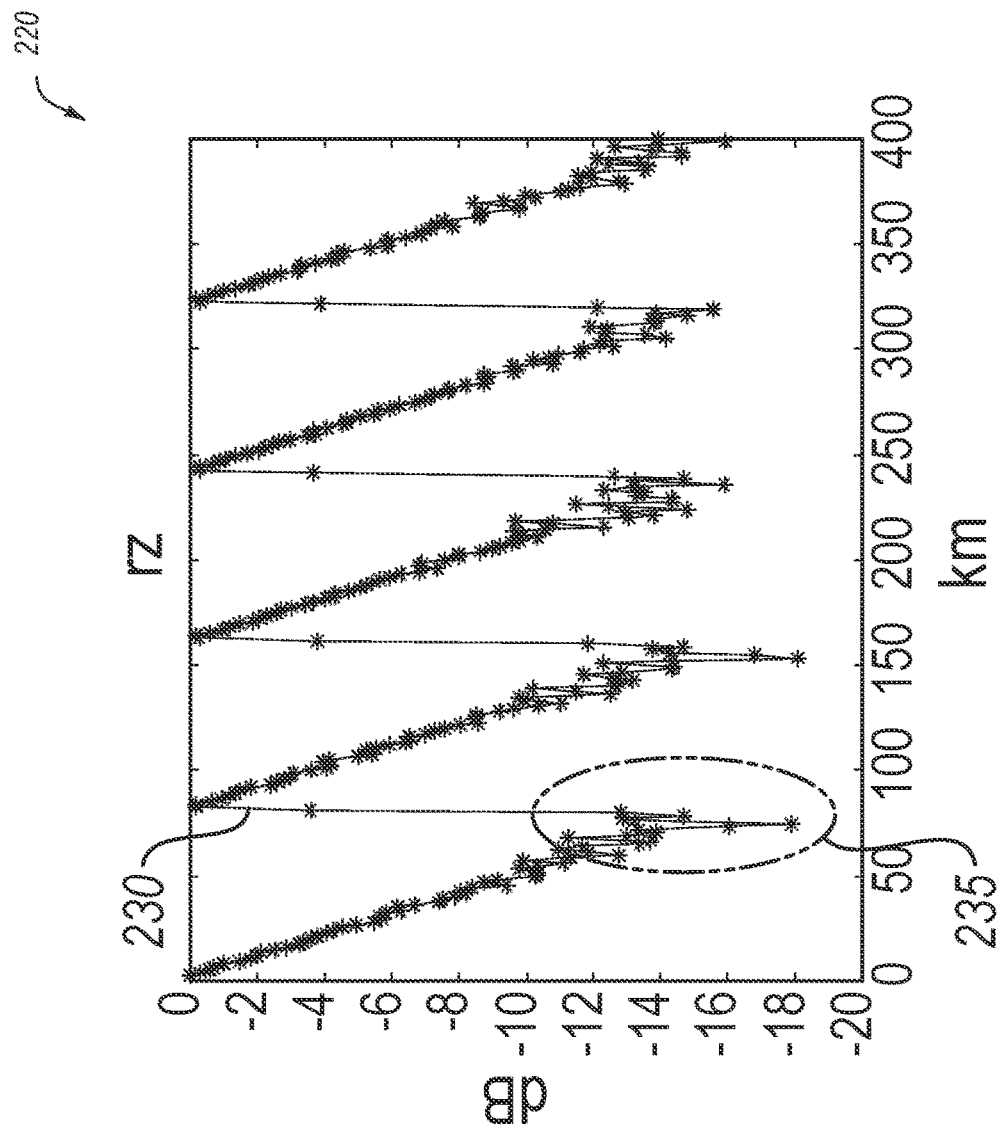

In another instance, multiple PPEs may be calculated and/or determined using multiple single waveform profiles, and an average of the multiple PPEs may be calculated to attempt to increase the accuracy of the PPE of the optical fiber. For example, FIG. 2B illustrates a graph 220 illustrating a power profile estimation 230. The power profile estimation 230 may be determined by calculating an average of multiple PPEs calculated using corresponding multiple single waveforms. However, such an approach may not substantially increase the accuracy of the PPE. For instance, compared to the power profile estimation 210 of FIG. 2B, the power profile estimation 230 does not illustrate an improved accuracy (e.g., the power profile estimation 230 includes noise). Particularly, the power profile estimation 230 does not reduce the noise in the regions with low optical power, such as a region 235. For instance, the region 235 of the power profile estimation 230 illustrates power loss ranging from around −14 dB to −18 dB, which does not improve the noise present in the region 215 of the power profile estimation 210 of FIG. 2A.

Figure 2C:
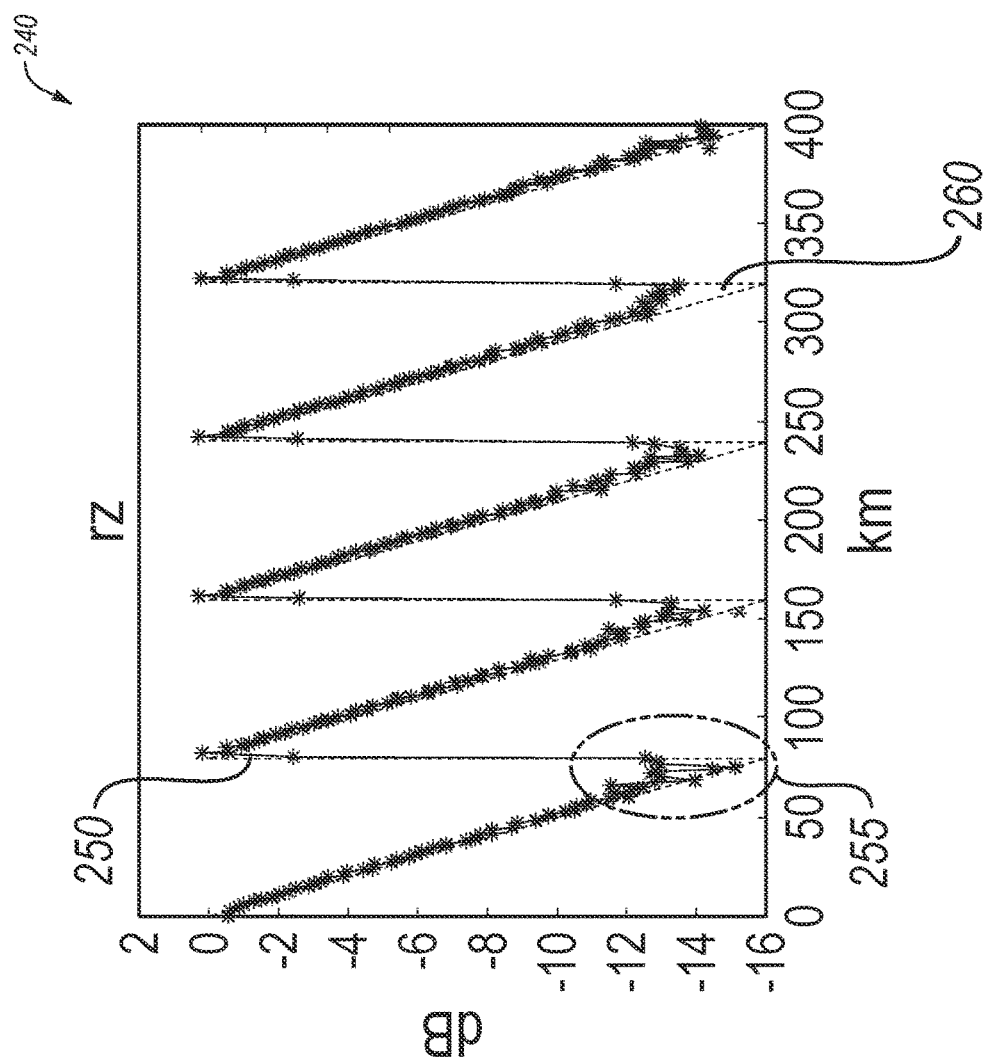

FIG. 2C illustrates an example graph 240 illustrating a power profile estimation 250 which may correspond to the PPE 172 of FIG. 1B. For instance, the power profile estimation 250 may represent a power profile estimation determined using combined waveform profiles. The power profile estimation 250 may illustrate less noise compared to the power profile estimation 210 of FIG. 2A or the power profile estimation 230 of FIG. 2B. Particularly, the power profile estimation 250 may be more accurate and/or include less noise in regions or parts of the power profile estimation 250 that correspond to portions of an optical fiber with lower power and lower NLI noise. For instance, a region 255 of the power profile estimation 250 illustrates less noise compared to the region 215 of FIG. 2A or the region 235 of FIG. 2B. For example, the power estimation 250 in the region 255 illustrates the power level from around −13 dB to −15 dB at 75 km. Additionally, the power profile estimation 250 has the lowest power level at −16 dB with the lowest power estimation being generally similar (e.g., around −16 dB) across different distances.

Additionally, the power profile estimation 250 may align more closely with an expected PPE 260. For instance, the expected PPE 260 may represent a PPE that is calculated or expected based on the specifications of different components of the optical system (e.g., transmitters, receivers, optical link, etc.). The power profile estimation 250 may align with the expected PPE 260 more closely than the power profile estimation 210 of FIG. 2A or the power profile estimation 230 of FIG. 2B.

Modifications, additions, or omissions may be made to the process 150 without departing from the scope of the present disclosure. For example, in some embodiments, the process 150 may include additional processes. For example, a third waveform profile corresponding to a third optical signal may be introduced. For instance, the first combination process 156 may be configured to combine the third waveform profile with the first waveform profile 152 and the second waveform profile 154. Additionally, the second combination process 166 may obtain the first reconstructed waveform profile 162, the second reconstructed waveform profile 164, and a third reconstructed waveform profile corresponding to the third waveform profile. In some embodiments, the third waveform profile may be combined directly with the first waveform profile 152 and the second waveform profile 154. For instance, the first combination process 156 may receive and/or obtain the first waveform profile 152, the second waveform profile 154, and the third waveform profile to generate the combined waveform profile 158.

In some embodiments, the first combination process 156 may obtain the first waveform profile 152 and the second waveform profile 154 after certain characteristics of the data from the first optical signal and/or the second optical signal have been adjusted by the DSP process in a digital domain to compensate for the changes. For example, the first optical signal and the second optical signal may be transmitted in different channels. The optical carrier frequency of each channel may be defined by laser frequency of the transmitters. The difference of laser frequencies between the channels may correspond to the channel spacing. Although, in some instances, the channel spacing may be defined as a specific frequency (e.g., 100 GHz or 50 GHz), the actual channel spacing may change due to frequency drift of lasers caused by environmental perturbation. Thus, in combining the first optical signal and the second optical signal, the center frequencies of the first optical signal and/or the second optical signal may be shifted in the digital domain such that the center frequencies of the first optical signal and the second optical signal are separated by the actual channel spacing corresponding to the difference of the optical carrier frequencies.

Figure 3:
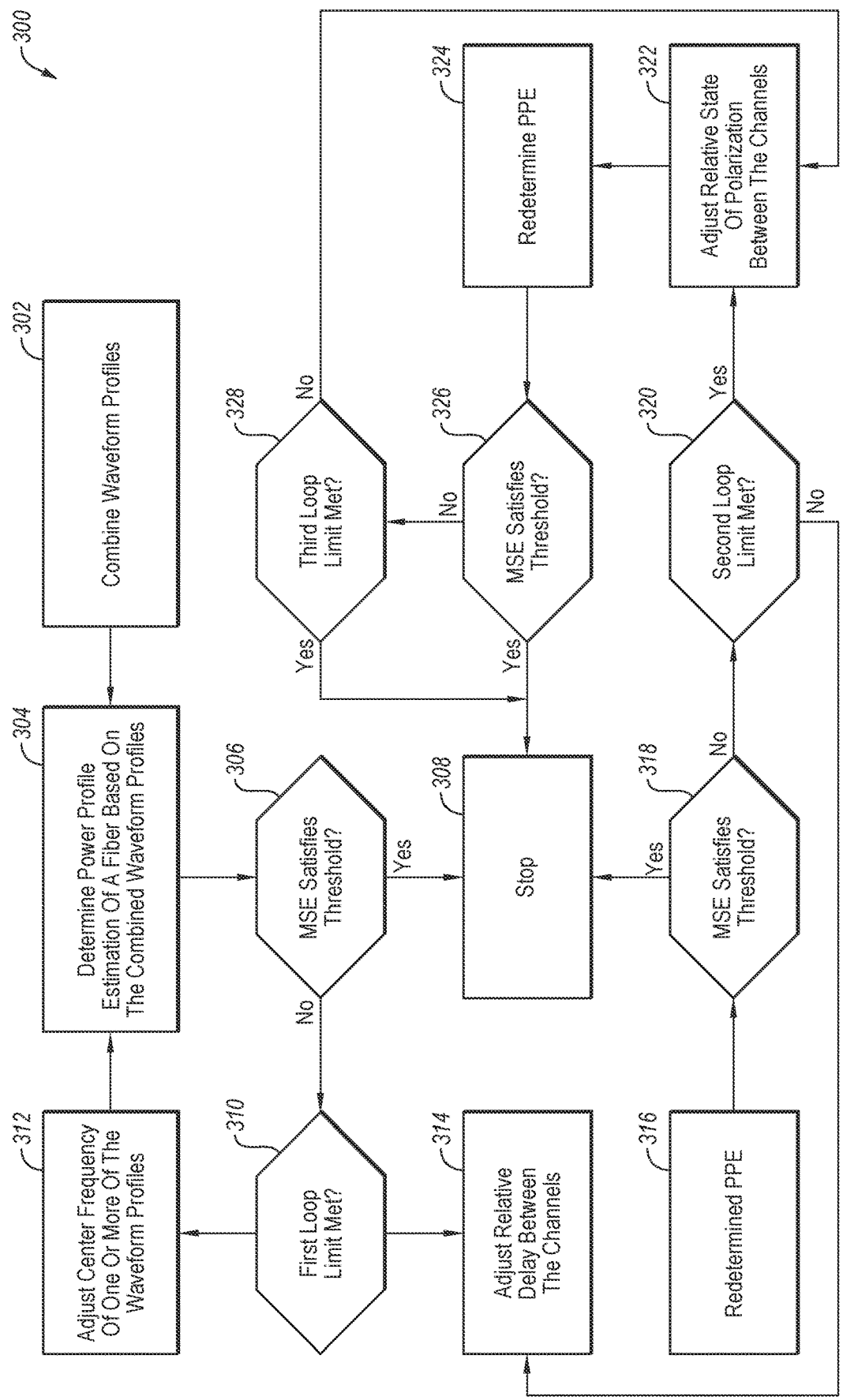
FIG. 3 is a flowchart of an example method of multi-channel power profile estimation, in accordance with one or more embodiments of the present disclosure.

FIG. 3 illustrates a flowchart of an example method 300 of multi-channel power profile estimation, in accordance with one or more embodiments of the present disclosure. In some embodiments, the method 300 may involve optimizing alignment of multiple signals. The method 300 may be performed by any suitable system, apparatus, or device. For example, the method 300 may be implemented using the system 100 of FIG. 1A or the computing system 500 of FIG. 5. Although illustrated with discrete blocks, the steps and operations associated with one or more blocks of the method 300 may be divided into additional blocks, combined into fewer blocks, or eliminated, depending on the particular implementation.

In some embodiments, the method 300 may begin at block 302. At block 302, waveform profiles may be combined. For example, a first waveform profile and a second waveform profile may be combined. Alternately or additionally, a first reconstructed waveform profile and a second reconstructed waveform profile may be combined. In these and other embodiments, the first waveform profile and the second waveform profile may be generated based on a first optical signal and a second optical signal received by a first receiver and a second receiver via an optical link, respectively. In some instances, the first waveform profile and the second waveform profile may be generated such that the first waveform profile and the second waveform profile represent optical waveforms of the first optical signal and the second optical signal, respectively. In some instances, the first waveform profile and the second waveform profile may also be referred to as a first reference waveform profile and a second reference waveform profile (collectively referred to as the "reference waveform profiles"). In some instances, the first optical signal and the second optical signal may be transmitted and received via separate optical channels which may cause a frequency, timing, and/or a state of polarization offset, or other offset between the first waveform profile and the second waveform profile.

In some embodiments, the first waveform profile and/or the second waveform profile may be adjusted to compensate for the offsets before the first waveform profile and the second waveform profile are combined. The compensation may be applied to the first waveform profile, the second waveform profile, or a combination of the first waveform profile and the second waveform profile.

As an example, a center frequency of the first waveform profile and the center frequency of the second waveform profile may be shifted to better align with the actual channel spacing. In these and other embodiments, an amount of the adjustment to the center frequency may be based on a channel spacing between the first optical signal that corresponds to the first waveform profile and the second optical signal that corresponds to the second waveform profile. For example, the center frequency of the first waveform profile may be shifted down by the half of the actual channel spacing while the center frequency of the second waveform profile may be shifted up by the half of the actual channel spacing in response to the first signal having a lower optical carrier frequency than the optical carrier frequency of the second signal.

As another example, the second waveform profile may be adjusted to compensate for a delay offset between the second waveform profile and the first waveform profile. The delay may be a result of the first optical signal and the second optical signal being transmitted in different channels and by different transmitters and receivers. The different optical path to different optical receivers (e.g., the first receiver 104 and the second receiver 114) after optical splitter 140 may contribute to relative delay between sampled waveforms. As such, a delay may exist between the first optical signal and the second optical signal that results in a delay between the first waveform profile and the second waveform profile. In these and other embodiments, how much the second waveform profile may be adjusted to compensate for the delay may be based on a known delay between the first optical signal and the second optical signal. In some embodiments, no known delay may exist. In these and other embodiments, no adjustment may be made for a delay.

As another example, the first waveform profile and the second waveform profile may be adjusted to compensate for a state of polarization offset between the first optical signal and the second optical signal. The state of polarization offset may be the result of the first optical signal and the second optical signal being transmitted in different channels and by different transmitters. As such, a state of polarization offset may exist between the first optical signal and the second optical signal that results in a state of polarization offset between the first waveform profile and the second waveform profile. In these and other embodiments, how much the first waveform profile and the second waveform profile may be adjusted to compensate for the state of polarization offset may be based on a known state of polarization offset between the first optical signal and the second optical signal. In some embodiments, no known state of polarization offset may exist. In these and other embodiments, no adjustment may be made for a state of polarization.

In some embodiments, the first reconstructed waveform profile and/or the second reconstructed waveform profile may be adjusted to compensate for the offsets before the first reconstructed waveform profile and the second reconstructed waveform profile are combined. The compensation may be applied to the first reconstructed waveform profile, the second reconstructed waveform profile, or a combination of the first reconstructed waveform profile and the second reconstructed waveform profile. In these and other embodiments, the first reconstructed waveform profile 162 and the second reconstructed waveform profile 164 may be adjusted in combination process 166 based on the same factors as the first waveform profile 152 and the second waveform profile 154 in the combination process 158, respectively.

At block 304, a PPE of the optical link may be determined based on combined waveform profiles. In some embodiments, the PPE may be determined using a combined waveform profile 158 and a emulated reconstructed waveform profile 168. The combined waveform profile may be a combination of the reference waveform profiles and the combined reconstructed waveform profile may be a combination of the reconstructed waveform profiles. In some embodiments, the combination of waveform profiles and the determination of the PPE may be performed in a digital domain by the DPS process.

At block 306, a MSE of the PPE may be compared against a threshold to determine whether the MSE satisfies (e.g., equal to or less than) a threshold. In some instances, the threshold may reflect minimum and/or optimal value for the MSE. In some embodiments, the threshold may be specified based on a specification of the system performing the method. In other embodiments, a user may set the threshold. In instances where the MSE meets the threshold, the method 300 may proceed to block 308 where the method 300 may come to an end. In some embodiments, the threshold may not be satisfied due to the first waveform profile and the second waveform profile not being aligned properly. For example, while the first waveform profile and the second waveform profile may be aligned at block 302, the compensation applied to the first waveform profile and/or the second waveform profile may not be sufficient to compensate for the offsets between the first waveform profile and the second waveform profile.

For example, the first waveform profile and the second waveform profile may be assigned channel frequencies such that that the first waveform profile and the second waveform profile are aligned at a certain channel spacing. However, due to frequency drift in the optical system, the channel spacing of the first waveform profile and the second waveform profile may be different than the set channel spacing for the optical system. Alternately or additionally, the delay between the first and second optical signals and/or the state of polarization between the optical signals in operation may be different than known parameters of the system. The comparison of the MSE to the threshold may indicate if one or more of the center frequencies, the delay, and/or the state of polarization is not aligned in a manner for determining the PPE or for achieving better results from the PPE. However, the comparison of the MSE to the threshold may not indicate which of the center frequency, the delay, and/or the state of polarization is not aligned. As such, the method 300 may include operations and/or steps that may be configured to further adjust the center frequency, the delay, and/or the state of polarization to achieve a better PPE result.

In instances where the threshold is not met, it may be determined whether a first loop limit has been met at block 310. The first loop limit may specify a number of iterations that may be performed for adjusting the center frequencies of the first and second waveform profiles to better align the center frequencies of the first and second waveform profiles. In some embodiments, the first loop limit may be set by the user. In these and other embodiments, a higher number of the first loop limit may permit more adjustment of the center frequencies which may permit finer tuning of the certain characteristics. In response to the first loop limit not being met, center frequencies of the first waveform profile and/or second waveform profile may be adjusted at block 312 such that the channel spacing between the first waveform profile and the second waveform profile is improved (e.g., gets closer to the known channel spacing value), which may also improve the MSE. An amount of the adjustment may be based on the MSE determined at block 304. Alternately or additionally, an amount of the adjustment may be based on a difference between the MSE and the threshold. In these and other embodiments, the adjustment may be changed during one or more iterations of performing the block 312. For example, during one iteration, the center frequency of the first waveform profile may be adjusted by a first amount and during a second iteration the center frequency of the second waveform profile may be adjusted by a second amount. The adjustment amount may be same for the first and second waveform profiles and first and second reconstructed waveform profiles.

In some embodiments, the adjustment may be made to the first and second waveform profiles and the first and second reconstructed waveform profiles. In these and other embodiments, after the adjustment, the first and second waveform profiles may be combined and the first and second reconstructed waveform profiles may be combined.

After adjusting the center frequencies, the PPE may be determined again at block 304. The PPE may be determined using the combined waveform profile and the emulated reconstructed waveform profile with the adjustments performed in block 312. The MSE may be checked again at block 306, and in response to the MSE not satisfying the threshold, the center frequencies may be further adjusted until the first loop limit is met at block 310 or the MSE satisfies the threshold at block 306.

In instances where the MSE does not satisfy the threshold and the first loop limit is met, the MSE may be further improved by adjusting a second characteristic of the first waveform profile and/or the second waveform profile. For example, at block 314, the relative delay between the first and second optical signals may be adjusted. In some instances, separate channels used to receive the first optical signal and the second optical signal may cause temporal alignment issues to the first waveform profile and the second waveform profile which may negatively affect the PPE in terms of the MSE. In these and other embodiments, the relative delay may be adjusted using one or more suitable techniques to achieve improved temporal alignment between the first waveform profile and the second waveform profile and between the first estimate waveform profile and the second reconstructed waveform profile. For example, the DSP may include an adaptive equalizer which may include one or more digital filters that include filter coefficients that may be adjusted to adjust the relative delay. In another example, the relative delay may be adjusted by resampling the waveforms in software/DSP domain with relative delay between the first waveform profile and the second waveform profiles. An amount of the adjustment may be based on the MSE determined at block 306 or 318.

Alternately or additionally, an amount of the adjustment may be based on a difference between the MSE and the threshold. In these and other embodiments, the adjustment may be changed during one or more iterations of performing the block 314. The adjustment amount may be same for the first and second waveform profiles and first and second reconstructed waveform profiles. In some embodiments, one or more hardware triggers may be used for delay adjustment between one or more waveform profiles received at corresponding receivers. For instance, the one or more hardware triggers may be configured to compensate propagation delay of the waveform profiles such that the delay time between the waveform profiles is reduced.

In some embodiments, the adjustment may be made to the first and second waveform profiles and the first and second reconstructed waveform profiles. In these and other embodiments, after the adjustment, the first and second waveform profiles may be combined and the first and second reconstructed waveform profiles may be combined.

Following adjusting the relative delay between the first and second waveform profiles and the first and second reconstructed waveform profiles at block 314, the PPE may be redetermined at block 316 using the combined waveform profile and the emulated reconstructed waveform profile with the adjustments performed in block 314. Accordingly, the MSE may also be redetermined and compared against the threshold at block 318. In response to the MSE satisfying the threshold, the method 300 may stop processing the method 300 at block 308.

In instances where the MSE fails to satisfy the threshold, it may be determined whether a second loop limit was met at block 320. In some embodiments, the second loop limit at block 320 may be the same as the second loop limit at block 310. In other embodiments, the second loop limit at block 320 may be different from the second loop limit at block 310.

In response to determining that the second loop limit is not yet met, the method 300 may include further adjusting the relative delay between the channels at block 314. In these instances, a loop of adjusting the relative delay between the channels (e.g., block 314), redetermining the PPE (e.g., block 316), and comparing the MSE against a threshold (e.g., at block 318) may be repeated until the MSE satisfies the threshold at block 318 or the second loop limit is met at block 320.

In response to the second loop limit being met, the method 300 may proceed to adjust a third characteristic of the first waveform profile and/or the second waveform profile such as the relative SOP between the waveform profiles at block 322. In some embodiments, the relative SOP between first waveform profile and the second waveform profile may vary as the first optical signal and the second optical signal may have different SOP as the signals are transmitted through separate channels. For instance, a x-polarization (or y-polarization) component of the first signal may not be aligned with a x-polarization (or y-polarization) component of the second signal at the coupler. In some embodiments, the relative SOP between the first waveform profile and the second waveform and between the first estimate waveform profile and the second reconstructed waveform profile may be adjusted using one or more DSP algorithms. For example, the SOP may be rotated in azimuthal and elliptical angles with a given step size to adjust the SOP. In some embodiments, any other techniques may be used to adjust the SOP. For example, the one or more DSP algorithms may include least a mean squares (LMS) algorithm, polarization mode dispersion (PMD) compensation algorithms, feedback based on error signal, among others.

At block 324, the PPE may be redetermined based on the reference waveform profiles with the adjusted SOP. The MSE of the redetermined PPE may be checked against the threshold to determine whether the MSE satisfies the threshold. In response to the MSE satisfying the threshold, the method 300 may finish adjusting the PPE and end the method at block 308.

An amount of the adjustment may be based on the MSE determined at block 318 or 326. Alternately or additionally, an amount of the adjustment may be based on a difference between the MSE and the threshold. In these and other embodiments, the adjustment may be changed during one or more iterations of performing the block 322. The adjustment amount may be same for the first and second waveform profiles and first and second reconstructed waveform profiles.

In some embodiments, the adjustment may be made to the first and second waveform profiles and the first and second reconstructed waveform profiles. In these and other embodiments, after the adjustment, the first and second waveform profiles may be combined and the first and second reconstructed waveform profiles may be combined.

In response to the MSE not satisfying the threshold, at block 328, it may be determined whether a third loop limit is met. In response to the third loop limit not being met, the relative SOP may be further adjusted between the waveform profiles at block 322. A loop of adjusting the relative SOP at block 322, redetermining the PPE at block 324, and comparing the MSE against the threshold at block 326 may be repeated until the third loop limit is met at block 328, or the MSE satisfies the threshold at block 326, in which instances, the method 300 may finish adjusting the PPE (e.g., by adjusting the relative SOP) and may stop the process at block 308.

Modifications, additions, or omissions may be made to the method 300 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

In some embodiments, the first characteristic (e.g., center frequency), the second characteristic (e.g., the relative delay), and the third characteristic (e.g., the relative SOP) of the first waveform profile and/or the second waveform profile may be adjusted in different orders. For instance, the first characteristic, the second characteristic, and the third characteristic may be adjusted in any order. For example, the relative delay may be adjusted first, followed by the relative SOP, and then the center frequency. In some embodiments, varying numbers of characteristics of the first waveform profile and the second waveform profile may be adjusted. For instance, only one of the first characteristic, the second characteristic and the third characteristic may be adjusted. In another instance, any two of the characteristics may be adjusted.

In some embodiments, one or more additional waveform profiles may be added to the combined waveform profiles and/or emulated reconstructed waveform profiles. For example, after combining and adjusting the first and second waveform profiles, one or more additional waveform profiles may be added to the combined waveform profiles. In these and other embodiments, the additional waveform profiles may be added one profile at the time. In these and other embodiments, the method 300 may be used each time that a waveform profile is added. In some embodiments, any number of additional waveform profiles from optical signals in adjacent channels may be added. For each reference waveform profile added an reconstructed waveform profile may also be added.

Figure 4:
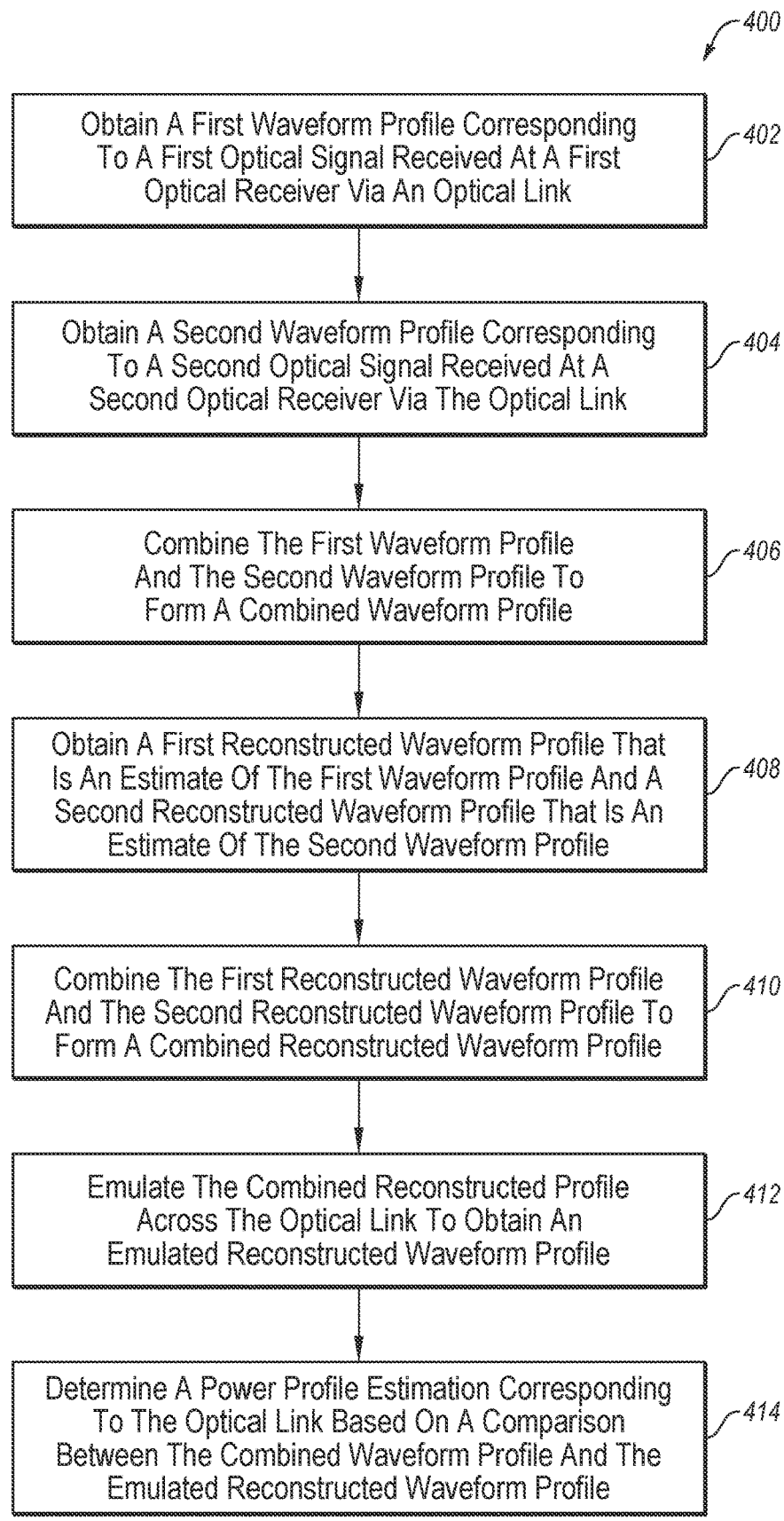
FIG. 4 is a flowchart of another example method of multi-channel power profile estimation, in accordance with one or more embodiments of the present disclosure.

FIG. 4 illustrates another example method 400 of multi-channel power profile estimation, in accordance with one or more embodiments of the present disclosure. The method 400 may be performed by any suitable system, apparatus, or device. For example, the method 400 may be implemented using the system 100 of FIG. 1A or the computing system 500 of FIG. 5. Although illustrated with discrete blocks, the steps and operations associated with one or more blocks of the method 400 may be divided into additional blocks, combined into fewer blocks, or eliminated, depending on the particular implementation.

In some embodiments, the method 400 may begin at block 402. At block 402, a first waveform profile corresponding to a first optical signal received at a first optical receiver via an optical link may be obtained. The first waveform profile may represent an optical waveform of the first optical signal as received at a first receiver. For example, the first waveform profile may provide information regarding characteristics of the first optical signal.

At block 404, a second waveform profile corresponding to a second optical signal received at a second optical receiver via the optical link may be obtained. The second waveform profile may represent an optical waveform of the second optical signal as received at a second receiver. For example, the second waveform profile may provide information regarding characteristics of the second optical signal.

At block 406, the first waveform profile and the second waveform profile may be combined to form a combined waveform profile. For instance, the first waveform profile and the second waveform profile may be combined in a digital domain via digital signal processing. In some embodiments, the first waveform profile and the second waveform profile may be combined using one or more operations such as up-sampling, frequency shifting, or summing, as described in further detail with respect to first combination process of 156 of FIG. 1B of the present disclosure.

At block 408, a first reconstructed waveform profile and a second reconstructed waveform profile may be obtained. In some embodiments, the first reconstructed waveform profile may be an estimate of the first waveform profile and the second reconstructed waveform profile may be an estimate of the second waveform profile at the first transmitter and the second transmitter respectively. For instance, the first reconstructed waveform profile may be the first waveform profile at the first transmitter reconstructed in DSP based on the received symbols or data at the first receiver and known characteristics of a first transmitter transmitting the first optical signal. The second reconstructed waveform profile may the second waveform profile at the second transmitter reconstructed in DSP based on the received symbols or data at the first receiver and known characteristics of a second transmitter transmitting the second optical signal.

At block 410, the first reconstructed waveform profile and the second reconstructed waveform profile may be combined to form a combined reconstructed waveform profile. The combining process may be described in further detail with respect to the second combination process 156 of FIG. 1B. At block 412, the combined reconstructed waveform profile may be emulated over the optical link to obtain an emulated reconstructed waveform profile.

At block 414, a PPE corresponding to the optical link may be determined based on a comparison between the combined waveform profile and the emulated reconstructed waveform profile. For instance, the comparison between the combined waveform profile and the emulated reconstructed waveform profile may provide insights on power distribution across different wavelengths or frequency components in an optical system. In some embodiments, the combined waveform profile and the emulated reconstructed waveform profile may be analyzed using any suitable methods, such as cross-correlation, root mean square error (RMSE), mean squared error (MSE), and mean absolute error (MAE).

Modifications, additions, or omissions may be made to the method 400 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

For example, the method 400 may further include adjusting one or more characteristics of one or more of the first waveform profile, the second waveform profile, the first reconstructed waveform profile, and the second reconstructed waveform prolife based on a difference between the combined waveform profile and the combined reconstructed waveform profile. In some embodiments, the one or more characteristics may include center frequencies between the optical signals, relative delay between the optical signals, and relative state of polarization between the optical signals. In some embodiments, the PPE may be redetermined following adjusting one or more of the one or more characteristics.

For instance, after adjusting the one or more characteristics of the first waveform profile, the second waveform profile, the first reconstructed waveform profile, and/or the second reconstructed waveform profile, the first waveform profile and the second waveform profile may be recombined to determine the combined waveform profile. The first reconstructed waveform profile and the second reconstructed waveform profile may be recombined to determine the combined reconstructed waveform profile. In some embodiments, the PPE may be determined based on the combined waveform profile and the combined reconstructed waveform profile. In some embodiments, the PPE may be redetermined multiple times after adjusting a certain characteristic.

In some embodiments, the method 400 may further include obtaining a third waveform profile corresponding to a third optical signal received at a third optical signal via the optical link. In some embodiments, the third waveform profile may be combined with the combined waveform profile to form an updated combined waveform profile.

Additionally, a third reconstructed waveform profile, which may be an estimate of the third waveform profile at a third transmitter may be obtained by reconstructing based on the received data or symbols at a third receiver and known characteristics of the third transmitter transmitting the third optical signal. In these and other embodiments, the combined reconstructed waveform profile may be combined with the third reconstructed waveform profile to form an updated combined reconstructed waveform profile. In some embodiments, the PPE may be determined based on the updated combined waveform profile and the updated emulated reconstructed waveform profile.

Figure 5:
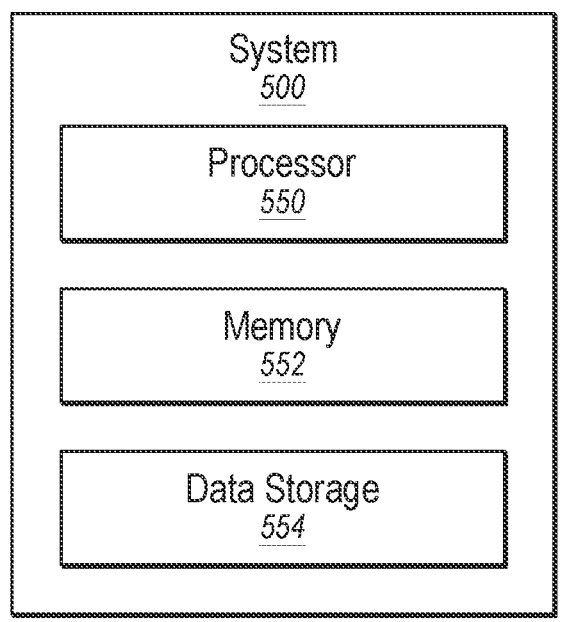
FIG. 5 is an example computing system, in accordance with one or more embodiments of the present disclosure.

FIG. 5 illustrates a block diagram of an example computing system 502, according to at least one embodiment of the present disclosure. The computing system 502 may be configured to implement or direct one or more suitable operations described in the present disclosure. For example, the computing system 502 may be configured to control the transmitters and receivers of FIG. 1A and/or calculate a PPE of an optical fiber as illustrated in FIG. 1B. Additionally, the computing system 502 may be configured to adjust one or more characteristics of waveform profiles as illustrated FIG. 3. The computing system 502 may include a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 550 may include any number of processors configured to, individually or collectively, perform or direct performance of any number of operations described in the present disclosure. Additionally, one or more of the processors may be present on one or more different electronic devices, such as different servers.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions are loaded into memory 552, the processor 550 may execute the program instructions.

The memory 552 and the data storage 554 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007).

Combinations of the above may also be included within the scope of computer-readable storage media. Computer-executable instructions may include, for example, instructions and data configured to cause the processor 550 to perform a certain operation or group of operations.

Modifications, additions, or omissions may be made to the computing system 502 without departing from the scope of the present disclosure. For example, in some embodiments, the computing system 502 may include any number of other components that may not be explicitly illustrated or described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a first waveform profile corresponding to a first optical signal received at a first optical receiver via an optical link;
   obtaining a second waveform profile corresponding to a second optical signal received at a second optical receiver via the optical link;
   combining the first waveform profile and the second waveform profile to form a combined waveform profile;
   obtaining a first reconstructed waveform profile that is an estimate of the first waveform profile and a second reconstructed waveform profile that is an estimate of the second waveform profile;
   combining the first reconstructed waveform profile and the second reconstructed waveform profile to form a combined reconstructed waveform profile;
   emulating the combined reconstructed waveform profile across the optical link to obtain an emulated reconstructed waveform profile;
   determining a power profile estimation corresponding to the optical link based on a comparison between the combined waveform profile and the emulated reconstructed waveform profile; and
   adjusting one or more aspects of optical transmission over the optical link based on the determined power profile estimation.

2. The method of claim 1, further comprising
   adjusting one or more characteristics of one or more of the first waveform profile, the second waveform profile, the first reconstructed waveform profile, and the second reconstructed waveform profile based on a difference between the combined waveform profile and the emulated reconstructed waveform profile.

3. The method of claim 2, wherein the one or more characteristics include center frequencies of the optical signals, relative delay between the optical signals, and relative state of polarization between the optical signals.

4. The method of claim 2, wherein the power profile estimation is determined after adjusting a first characteristic of the one or more characteristics.

5. The method of claim 2, wherein the determining the power profile estimation includes reducing the difference between the combined waveform profile and the emulated reconstructed waveform profile closer to a threshold.

6. The method of claim 1, further comprising:
adjusting one or more characteristics of one or more of the first waveform profile, the second waveform profile, the first reconstructed waveform profile, and the second reconstructed waveform profile based on a difference between the combined waveform profile and the emulated reconstructed waveform profile;
after adjusting the one or more characteristics, recombining the first waveform profile and the second waveform profile to form the combined waveform profile; and
after adjusting the one or more characteristics, recombining the first reconstructed waveform profile and the second reconstructed waveform profile to form the combined reconstructed waveform profile.

7. The method of claim 6, further comprising:
determining a second power profile estimation based on a second comparison between the recombined waveform profile and the emulated reconstructed waveform profile,
wherein the determining the power profile estimation includes determining the difference between the combined waveform profile and the emulated reconstructed waveform profile.

8. The method of claim 7, further comprising:
after determining the second power profile estimation, adjusting a second characteristic of one or more of the first waveform profile, the second waveform profile, the first reconstructed waveform profile, and the second reconstructed waveform profile based on the second power profile estimation;
recombining the first waveform profile and the second waveform profile to form a second recombined waveform profile;
recombining the first reconstructed waveform profile and the second reconstructed waveform profile to form a second recombined reconstructed waveform profile;
emulating the recombined reconstructed waveform profile to obtain a re-emulated reconstructed waveform profile; and
determining a third power profile estimation based on a third comparison between the second recombined waveform profile and the re-emulated reconstructed waveform profile.

9. The method of claim 1, wherein the combining the first waveform profile and the second waveform profile comprises:
upsampling the first waveform profile and the second waveform profile;
shifting a frequency of the first waveform profile and a frequency of the second waveform profile; and
summing the first waveform profile and the second waveform profile.

10. The method of claim 1, further comprising:
obtaining a third waveform profile corresponding to a third optical signal received at a third optical receiver via the optical link;
combining the combined waveform profile and the third waveform profile to form an updated combined waveform profile;
obtaining a third reconstructed waveform profile that is an estimate of the third waveform profile;
combining the combined reconstructed waveform profile and the third reconstructed waveform profile to form an updated combined reconstructed waveform profile; and
emulating the updated combined reconstructed waveform profile across the optical link to obtain the updated emulated reconstructed waveform profile,
wherein the power profile estimation is determined based on the updated emulated reconstructed waveform profile and the updated combined waveform profile.

11. One or more non-transitory computer-readable media storing instructions that, when executed by one or more processors, cause a system to perform operations, the operations comprising:
obtaining a first waveform profile corresponding to a first optical signal received at a first optical receiver via an optical link;
obtaining a second waveform profile corresponding to a second optical signal received at a second optical receiver via the optical link;
combining the first waveform profile and the second waveform profile to form a combined waveform profile;
obtaining a first reconstructed waveform profile that is an estimate of the first waveform profile and a second reconstructed waveform profile that is an estimate of the second waveform profile;
combining the first reconstructed waveform profile and the second reconstructed waveform profile to form a combined reconstructed waveform profile;
emulating the combined reconstructed waveform profile across the optical link to obtain an emulated reconstructed waveform profile;
determining a power profile estimation corresponding to the optical link based on a comparison between the combined waveform profile and the emulated reconstructed waveform profile; and
adjusting one or more aspects of optical transmission over the optical link based on the determined power profile estimation.

12. The one or more non-transitory computer-readable media of claim 11, the operations further comprising:
adjusting one or more characteristics of one or more of the first waveform profile, the second waveform profile, the first reconstructed waveform profile, and the second reconstructed waveform profile based on a difference between the combined waveform profile and the combined reconstructed waveform profile.

13. The one or more non-transitory computer-readable media of claim 12, wherein the one or more characteristics include center frequencies of the optical signals, relative delay between the optical signals, and relative state of polarization between the optical signals.

14. The one or more non-transitory computer-readable media of claim 12, wherein the power profile estimation is determined after adjusting a first characteristic of the one or more characteristics.

15. The one or more non-transitory computer-readable media of claim 12, wherein the determining the power profile estimation includes determining the difference between the combined waveform profile and the emulated reconstructed waveform profile.

16. The one or more non-transitory computer-readable media of claim 12, the operations further comprising:

adjusting one or more characteristics of one or more of the first waveform profile, the second waveform profile, the first reconstructed waveform profile, and the second reconstructed waveform profile based on a difference between the combined waveform profile and the emulated reconstructed waveform profile;

after adjusting the one or more characteristics, recombining the first waveform profile and the second waveform profile to form the combined waveform profile; and after adjusting the one or more characteristics, recombining the first reconstructed waveform profile and the second reconstructed waveform profile to form the combined reconstructed waveform profile.

17. The one or more non-transitory computer-readable media of claim 16, the operations further comprising:

determining a second power profile estimation based on a second comparison between the recombined waveform profile and the recombined reconstructed waveform profile, wherein the determining the power profile estimation includes determining the difference between the combined waveform profile and the emulated reconstructed waveform profile.

18. The one or more non-transitory computer-readable media of claim 17, the operations further comprising:

after determining the second power profile estimation, adjusting a second characteristic of one or more of the first waveform profile, the second waveform profile, the first reconstructed waveform profile, and the second reconstructed waveform profile based on the second power profile estimation;

recombining the first waveform profile and the second waveform profile to form a second recombined waveform profile;

recombining the first reconstructed waveform profile and the second reconstructed waveform profile to form a second recombined reconstructed waveform profile;

emulating the second recombined reconstructed waveform profile across the optical link to obtain a second emulated reconstructed waveform profile; and determining a third power profile estimation based on a third comparison between the second recombined waveform profile and the second emulated reconstructed waveform profile.

19. The one or more non-transitory computer-readable media of claim 11, wherein at least one individual aspect of the one or more aspects of optical transmission is adjusted using one or more hardware triggers.

20. A system, comprising:

one or more processors; and one or more non-transitory computer-readable storage media configured to store instructions that, in response to being executed, cause the system to perform operations, the operations comprising:

obtaining a first waveform profile corresponding to a first optical signal received at a first optical receiver via an optical link;

obtaining a second waveform profile corresponding to a second optical signal received at a second optical receiver via the optical link;

combining the first waveform profile and the second waveform profile to form a combined waveform profile;

obtaining a first reconstructed waveform profile that is an estimate of the first waveform profile and a second reconstructed waveform profile that is an estimate of the second waveform profile;

combining the first reconstructed waveform profile and the second reconstructed waveform profile to form a combined reconstructed waveform profile;

emulating the combined reconstructed waveform profile across the optical link to obtain an emulated reconstructed waveform profile;

determining a power profile estimation corresponding to the optical link based on a comparison between the combined waveform profile and the emulated reconstructed waveform profile; and adjusting one or more aspects of optical transmission over the optical link based on the determined power profile estimation.

* * * * *